United States Patent [19]
Ohrbom et al.

[11] Patent Number: 6,166,148
[45] Date of Patent: *Dec. 26, 2000

[54] DURABILITY ENHANCING AGENTS, METHOD THEREFORE AND CURED COATING COMPOSITIONS CONTAINING THE SAME

[75] Inventors: Walter H. Ohrbom, Hartland Township; Donald L. St. Aubin, Commerce Township; John E. Boisseau, Bloomfield Hills; Patricia K. Oberg, Birmingham; John W. Rehfuss, West Bloomfield, all of Mich.

[73] Assignee: BASF Corporation, Southfield, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/769,245

[22] Filed: Dec. 18, 1996

[51] Int. Cl.[7] ..................................................... C08F 26/06
[52] U.S. Cl. ................................... 525/326.7; 525/327.1; 525/328.2; 525/330.5; 525/330.3
[58] Field of Search .............................. 524/91, 100, 191, 524/198, 199, 201; 528/369; 525/326.7, 327.1, 328.2, 330.3, 330.5; 526/259, 263, 265, 301, 313, 318, 329.7; 544/216; 560/158, 25, 26; 546/224, 231, 229; 548/259, 260

[56] References Cited

U.S. PATENT DOCUMENTS

| | | | |
|---|---|---|---|
| 3,303,211 | 2/1967 | Peterson et al. | 560/26 |
| 3,674,838 | 7/1972 | Nordstrom | 260/482 |
| 4,078,015 | 3/1978 | Leitheiser | 560/26 |
| 4,179,548 | 12/1979 | Schroeter et al. | 525/329 |
| 4,210,612 | 7/1980 | Karrer | 526/263 |
| 4,223,147 | 9/1980 | Oertel et al. | 546/224 |
| 4,230,857 | 10/1980 | Drake et al. | 560/25 |
| 4,276,401 | 6/1981 | Karrer et al. | 526/265 |
| 4,292,237 | 9/1981 | Layer et al. | 526/263 |
| 4,340,497 | 7/1982 | Knopf | 560/158 |
| 4,369,274 | 1/1983 | Thomas | 526/265 |
| 4,395,508 | 7/1983 | Nelli et al. | 528/369 |
| 4,504,628 | 3/1985 | Johnson | 560/25 |
| 4,692,485 | 9/1987 | Leistner et al. | 526/263 |
| 5,004,770 | 4/1991 | Cortolano et al. | |
| 5,047,489 | 9/1991 | Ravichandran et al. | 526/263 |
| 5,057,610 | 10/1991 | Pastor et al. | 560/158 |
| 5,096,950 | 3/1992 | Galbo et al. | |
| 5,106,891 | 4/1992 | Valet | |
| 5,124,378 | 6/1992 | Behrens et al. | |
| 5,216,156 | 6/1993 | Galbo et al. | |
| 5,439,970 | 8/1995 | Reeb | 526/301 |
| 5,459,222 | 10/1995 | Rodgers et al. | 560/26 |
| 5,461,151 | 10/1995 | Waterman | |
| 5,474,811 | 12/1995 | Rehfuss et al. | 427/407.1 |
| 5,495,029 | 2/1996 | Steinmann et al. | 560/26 |
| 5,541,274 | 7/1996 | Steinmann | 526/265 |

FOREIGN PATENT DOCUMENTS 46 8 418   1/1992   European Pat. Off.

OTHER PUBLICATIONS

Ciba–Geigy Disclosure; "Polymerisable UV–absorbers used in photography"; May 1991; pp. 32592, 35917, 35917.

*Primary Examiner*—Veronica P. Hoke
*Attorney, Agent, or Firm*—Anne Gerry Sabourin

[57] ABSTRACT

A durability enhancing agent which is an ultraviolet light absorbing compound or hindered amine light stabilizer covalently bonded to a monomeric, oligomeric or polymeric component. The durability enhancing agent includes more than one carbamate functional group, group convertible to a carbamate group, or group that is crosslinked via a carbamate group. The durability enhancing agent may also have other reactive functionality thereon. Also included is a coating composition including the durability enhancing agent.

4 Claims, No Drawings

DURABILITY ENHANCING AGENTS, METHOD THEREFORE AND CURED COATING COMPOSITIONS CONTAINING THE SAME

BACKGROUND OF THE INVENTION

1. Field of the Invention

The present invention relates to ultraviolet light absorber and hindered amine light stabilizer compounds, method therefore and coating compositions containing the same, wherein the compounds include a carbamate functionality.

2. Discussion of the Prior Art

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberrations at the surface of the coating in order to achieve the desired visual effect such as high distinctness of image (DOI).

In the field of automotive coatings, it has become an objective to obtain a clearcoat (i.e., the outermost automotive coating) that is resistant to being etched by environmental fallout. Environmental etching is manifested by pitting, water spotting or chemical spotting of the coating or any combination of these. Etch resistance is desirable because it improves the appearance and useful life of the coating.

Etch resistance can be measured by visual examination of the coating, or by a profilometer or by subjecting a coating on a test panel to a saline solution in a temperature gradient oven test. Etch resistance is generally measured by visual examination by individuals skilled at examining finishes for the degree of etch therein. Etch resistance has become more important as the amount of acid rain, and other industrial fallout has increased. Currently, environmental etching of automotive finishes is generally greatest in the areas most greatly affected by industrial fallout.

The addition of UVAs and HALS generally improves the durability of coatings upon exposure to weathering. The incorporation into a coating composition of a UVA or HALS that is bound to a monomer, oligomer or polymer in a coating composition, stabilizes the UVA or HALS, prevents migration of the UVA or HALS into other coating layers and retains the UVA or HALS in the clearcoat, where it is needed.

Coatings containing carbamate functional resins or additives show little or no improvement in etch resistance with free additions of durability enhancing agents (i.e. HALS or UVAs that are not polymer- or oligomer-bound). It was unexpectedly found that the addition of HALS or UVAs bound to polymers- or oligomers including a carbamate functionality provide greater etch resistance of a cured coating film, than that obtainable with a carbamate functional resin alone.

SUMMARY OF THE INVENTION

According to the present invention, durability enhancing agents comprise ultraviolet light absorber (UVA), hindered amine light stabilizer (HALS) compounds or mixtures thereof, bonded to a monomeric, oligomeric or polymeric component, wherein the agent includes more than one carbamate functional group, group convertable to a carbamate functional group, or group that is crosslinked with carbamate functionality. The durability enhancing agent may also include additional reactive functionality that may be crosslinked into a cured coating. The durability enhancing agent may comprise more than one UVA or HALS bound thereto, or a mixture of UVA(s) and HALS bound to the monomeric, oligomeric or polymeric component.

The monomer-, oligomer- or polymer-bound HALS or UVA may comprise the principal resin, or a separate component of the coating composition. The invention is also directed to the cured coating composition, and a method for incorporating ultraviolet light absorbing compounds and hindered amine light stabilizers into a coating composition. The UVA or HALS is reacted into a coating film by reacting the ultraviolet light absorbing and/or hindered amine light stabilizing compound into a crosslinked matrix which is formed upon curing the coating composition.

The incorporation of the monomer-, oligomer-, or polymer- bound UVA and/or HALS having carbamate functionality into a coating composition provides the unexpected result of improved etch resistance of the cured film.

DETAILED DESCRIPTION OF THE INVENTION

The present invention is a durability enhancing agent which is a monomer-bound, oligomer-bound or polymer-bound ultraviolet light absorber or hindered amine light stabilizer. The durability enhancing agent comprises one or more UVA or HALS covalently bonded to a monomeric, oligomeric or polymeric component, and the agent includes more than one carbamate functional group, group convertible to a carbamate group, or group that is crosslinked with carbmate functionality. The carbamate functionality may be reacted on to the HALS or UVA first and then incorporated into the monomer, oligomer, or polymer or the carbamate may comprise part of the monomer, oligomer or polymer that reacts with the HALS or UVA. Alternatively, the carbamate may be present in a separate component of the coating composition, and reacted with the durability enhancing agent during cure. The durability enhancing agent may also include other reactive functionality which is crosslinkable into a coating film. Such reactive functionality may include amine, hydroxy, epoxy and isocyanate functionalities, or a mixture of these.

One or more of the monomeric, oligomeric, or polymeric UVA or HALS components may be incorporated into a coating composition in combination with other free UVA and HALS, if desired.

Examples of ultraviolet light absorbers useful in the present invention include benzotriazoles, 2-hydroxybenzophenones, oxanilide, and 2-hydroxyphenyltriazines. Good etch results are obtained when the ultraviolet absorber is a polymer-bound benzotriazole.

Examples of useful benzotriazoles are set forth in U.S. Pat. No. 5,106,891, which is hereby incorporated by reference. One example of the benzotriazoles useful in the present invention is shown in formula (Ia):

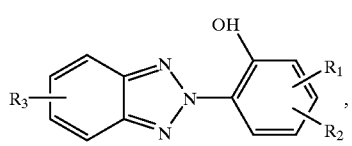

(Ia)

wherein, in the compounds of the formula (Ia), $R_1$, $R_2$ and $R_3$ can be hydrogen, but at least one of the radicals $R_1$ and $R_2$ must be other than hydrogen. Additionally, $R_1$, $R_2$ and $R_3$ can be halogen, hydroxyl halogen methyl, alkyl having 1 to 18 carbons, phenyl alkyl having 1 to 4 carbons in the alkyl moiety, hydroxy alkyl having 1 to 24 carbon atoms in the alkyl chain, such as methyl, ethyl, propyl, butyl, hexyl, octyl, nonyl, dodecyl, tetradecyl, hexadecyl, octadecyl, nonadecyl and eicosyl and also corresponding branched isomers, alkyl substituted by —COOH, —COOY$_8$, —CONH$_2$, —CONHY$_9$, —CONY$_9$Y$_{10}$, —NH$_2$, —NHY$_9$, —NY—$_9$Y$_{10}$, —NHCOY$_{11}$, —CN, and/or —OCOY$_{11}$, which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or —SO$_2$Y$_{13}$, or, if u is 2, Y$_2$ is alkylene having 2 to 16 carbon atoms, alkylene having 4 to 12 carbon atoms, xylene, alkylene which has 3 to 20 carbon atoms, is interrupted by one or more —O— atoms and/or substituted by hydroxyl, —CH$_2$CH(OH)CH$_2$—O—Y$_{15}$, —OCH$_2$CH(OH)CH$_2$, —CO—Y$_{16}$—CO—, —CO—NH—Y$_{17}$—NH—CO—, or —(CH$_2$)$_m$—CO$_2$—Y$_{18}$—OCO—(CH$_2$)$_m$, in which m is 1,2 or 3, Y$_8$ is amine, alkylamine or cycloalkyl amine wherein the alkyl or cycloalkyl portion is 1 to 6 carbon atoms, alkyl having 1 to 18 carbon atoms, alkenyl having 3 to 18 carbon atoms, alkyl which has 3 to 20 carbon atoms, is interrupted by one or more oxygen or sulfur atoms or —NT$_6$— and/or is substituted by hydroxyl, alkyl which has 1 to 4 carbon atoms and is substituted by —P(O)(OY$_{14}$)$_2$, —NY$_9$Y$_{10}$ or —OCOY$_{11}$ and/or hydroxyl, alkenyl having 3 to 18 carbon atoms, glycidyl, or phenylalkyl having 1 to 5 carbon atoms in the alkyl moiety, Y$_9$ and Y$_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or Y$_9$ and Y$_{10}$ together are alkylene, oxalkylene or azaalkylene having in each case 3 to 9 carbon atoms, Y$_{11}$ is alkyl having 1 to 18 carbon atoms, alkenyl having 2 to 18 carbon atoms or phenyl, Y$_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, Y$_{13}$ is alkyl having 1 to 18 carbon atoms, phenyl or alkyphenyl having 1 to 8 carbon atoms in the alkyl radical, Y$_{14}$ is alkyl having 1 to 12 carbon atoms or phenyl, Y$_{15}$ is alkylene having 2 to 10 carbon atoms, pheneylene or a group -phenylene-M-phenylene- in which M is —O—, —S—, —SO$_2$—, —CH$_2$— or —C(CH$_3$)$_2$—, y$_{16}$ is alkylene, oxaalkylene or thiaalkylene having in each case 2 to 10 carbon atoms, phenylene or alkenylene having 2 to 6 carbon atoms, Y$_{17}$ is alkylene having 2 to 10 carbon atoms, phenylene or alkylphenlene having 1 to 11 carbon atoms in the alkyl moiety, and Y$_{18}$ is alkylene having 2 to 10 carbon atoms or alkylene which has 4 to 20 carbon atoms and is interrupted once or several times by oxygen.

$R_1$ may be phenylalkyl having 1 to 4 carbon atoms in the alkyl moiety, for example benzyl, and can also be cycloalkyl having 5 to 8 carbon atoms, for example cyclopentyl, cyclohexyl and cyclooctyl, or a radical of the formula

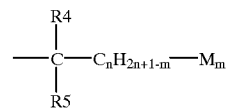

in which $R_4$ and $R_5$ independently of one another are alkyl having in each case 1 to 5 carbon atoms, in particular methyl, or $R_4$ together with the radical $C_nH_{2n+1-m}$, forms a cyclolakyl radical having 5 to 12 carbon atoms, for example cyclohexyl, cyclooctyl and cyclodecyl. M is a radical of the formula —COOR$_6$ in which R$_6$ is hydrogen, or alkyl having 1 to 12 carbon atoms, or alkoxyalkyl having 1 to 20 carbon atoms in each of the alkyl and the alkoxy moieties. Suitable alkyl radicals $R_6$ are those enumerated for $R_1$. Examples of suitable alkoxyalkyl groups are —C$_2$H$_4$OC$_2$H$_5$, —C$_2$H$_4$OC$_8$H$_{17}$ and —C$_4$H$_8$OC$_4$H$_9$. As phenylalkyl having 1 to 4 carbon atoms, $R_6$ is, for example, benzyl, cumyl, α-methylbenzyl or phenylbutyl.

At least one of the radicals $R_1$ and $R_2$ must be other than hydrogen.

Alternatively, the benzotriazole has the following formula:

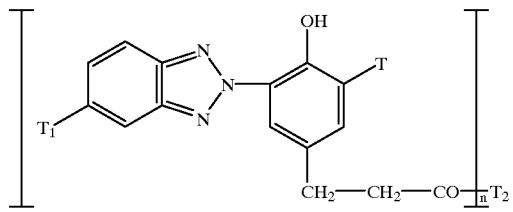

I(b)

In the compounds of the formula (Ib) T is hydrogen or alkyl having 1 to 6 carbon atoms, such as methyl and butyl, $T_1$ is hydrogen, chlorine or alkyl or alkoxy having in each case 1 to 4 carbon atoms, for example methyl, methoxy and butoxy, and n is 1 or 2. If n is 1, $T_2$ is chlorine or a radical of the formula —OT$_3$ or

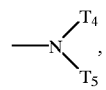

and if n is 2, $T_2$ is a radical of the formula

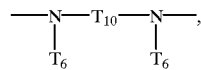

or —O—T$_9$—O—, where $T_3$ is hydrogen, alkyl which has 1 to 18 carbon atoms and is unsubstituted or substituted by 1 to 3 hydroxyl groups or by —OCOT$_6$, alkyl which has 3 to 18 carbon atoms, is interrupted once or several times by —O— or —NT$_6$— and is unsubstituted or substituted by hydroxyl or —OCOT$_6$. Examples of $T_3$ as cycloalkyl include cycloalkyl having 5 to 12 carbon atoms, such as cyclopentyl, cyclohexyl or cyclooctyl and is unsubstituted or substituted by hydroxyl and/or alkyl having 1 to 4 carbon atoms in the alkyl moiety, for example benzyl or phenylbutyl. $T_3$ can also be alkenyl having 2 to 18 carbon atoms. Suitable alkenyl radicals are derived from the alkyl radicals enumerated in the definitions of $R_1$. These alkenyl radicals can be substituted by hydroxyl. Examples of $T_3$ as phenylalkyl are benzyl, phenylethyl, cumyl, α-methylbenzyl or benzyl. $T_3$ can also be a radical of the formula —CH$_2$C—H(OH)—$T_7$ or

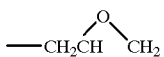

$T_4$ and $T_5$ independently of one another are hydrogen, alkyl having 1 to 18 carbon atoms, alkyl which has 3 to 18 carbon atoms and is interrupted once or several times by —O— or NT$_6$—, cycloalkyl having 5 to 12 carbon atoms, for example, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, $T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety, $T_7$ is hydrogen, alkyl having 1 to 18 carbon atoms, phenyl which is unsubstituted or substituted by hydroxyl, phenylakyl having 1 to 4 carbon atoms in the alkyl moiety, or —CH$_2$OT$_8$, $T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl.

Alternatively, the polymer-bound ultraviolet light absorber may comprise triazines such as 2-hydroxyphenyl triazines having the formula (IIa)

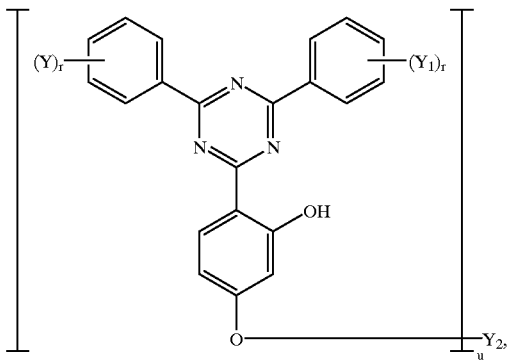

in the formula (IIa)

u is 1 to 2, r is an integer from 1 to 3, the substituents $Y_1$ independently of one another are hydrogen, hydroxyl, halogen, halogenomethyl, alkyl having 1 to 12 carbon atoms, alkoxy having 1 to 18 carbon atoms, when u is 1, $Y_2$ is alkyl having 1 to 18 carbon atoms, alkyl which has 1 to 12 carbon atoms and is substituted by —COOH  —COOY$_8$, —CONH$_2$, CONHY$_9$, —ONY$_9$Y$_{10}$, —CN, —OCOY$_{11}$, or mixtures thereof; alkyl which has 4 to 20 carbon atoms which is interrupted by one or more oxygen atoms and is unsubstituted or substituted by hydroxyl or alkoxy having 1 to 12 carbon atoms; alkenyl having 3 to 6 carbon atoms, glycidyl, phenylalkyl which has 1 to 5 carbon atoms in the alkyl moiety and is unsubstituted or substituted by hydroxyl, chlorine and or methyl; —COY$_{12}$ or SO$_2$Y$_{13}$, wherein $Y_8$ is amino, alkylamine or cycloalkylamine wherein the alkyl or cycloalkyl portion is 1 to 6 carbon atoms, alkyl having 1 to 18 carbon atoms, alkenyl having 3 to 18 carbon atoms, alkyl which has 3 to 20 carbon atoms, and is interrupted by one or more oxygen atoms, or said alkyl substituted by substituted by hydroxyl; alkenyl having 3 to 18 carbon atoms, glycidyl or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical; and when u is 2, $Y_2$ is alkylene having 2 to 16 carbon atoms, alkylene having 4 to 12 carbon atoms and is interrupted by one or more —O— atoms and/or is substituted by hydroxyl; —CH$_2$CH(OH)CH$_2$—O—Y$_{15}$—OCH$_2$CH(OH)CH$_2$, or —(CH$_2$)$_m$—CO$_2$—Y$_{18}$—OCO—(CH$_2$)$_m$, in which m is 1,2 or 3, $Y_{15}$ is alkylene having 2 to 10 carbon atoms, phenylene or a group -phenylene-M-phenylene- in which M is —O—, —S—, —SO$_2$—, —CH$_2$— or —C(CH$_3$)$_2$—, and $Y_{18}$ is alkylene having 2 to 10 carbon atoms or alkylene which has 4 to 20 carbon atoms and is interrupted once or several times by oxygen.

Other UVAs include triazines such as those described in U.S. Pat. No. 5,461,151 to Waterman, which is hereby incorporated by reference. These triazines have the formula:

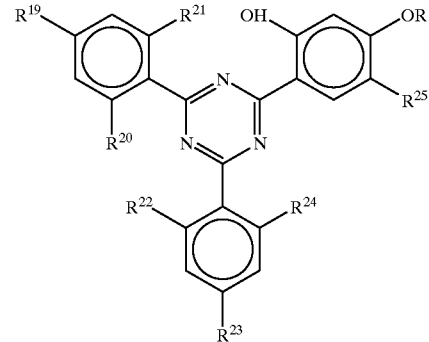

wherein the R moiety of the OR group is a linear or branched aliphatic alkyl group containing 3 carbon atoms substituted by one or more alkoxy groups of 1 to 12 carbon atoms, said moiety being further substituted by one or more hydroxy groups, and wherein $R^{19}$, $R^{20}$, $R^{21}$, $R^{22}$, $R^{23}$, $R^{24}$ and $R^{25}$ are independently selected from the group consisting of hydrogen, hydroxy, alkyl of 1 to 12 carbon atoms, alkoxy of 1 to 12 carbon atoms, sulfonic, halo, carboxy, haloalkyl and acrylamino.

In a preferred embodiement the triazine has the formula:

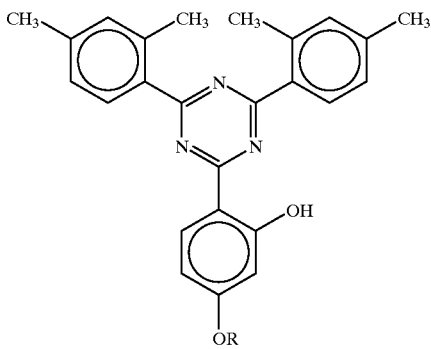

wherein the R moiety is, independently, a linear, branched aliphatic or cycloaliphatic alkyl moiety of 1 to 12 carbon atoms, and is:
(1) interrupted by one or more oxygen atoms; or
(2) substituted by one or more hydroxy groups; or
(3) both interrupted and substituted by the above groups of (1) and (2).

Examples of hindered amine light stabilizers useful in the present invention include derivatives of 2,2,6,6-tetramethylpiperidine. These stabilizers protect polymers by functioning as light-stable antioxidants. The hindered amine light stabilizers contain a reactive functionality thereon for reaction with the polymer or oligomer. The reactive functionality may comprise a group such as hydroxyl, carboxyl, amine, or ethylenically unsaturated group. The ultraviolet light absorber or hindered amine light stabilizer compounds are reacted onto the oligomer or polymer by addition or grafting reactions with the reactive functionality on the HALS or UVA. Example of such HALS are set forth in U.S. Pat. No. 5,216,156 to Galbo, U.S. Pat. Nos. 5,004,770 and 5,124,378 to Behrens et al.

One such example of a suitable HALS for purposes of the present invention is an O-substituted N-hydroxyl hindered amine light stabilizer having the formula:

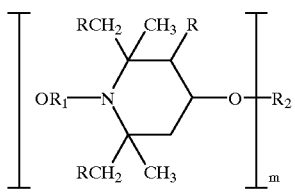

wherein R is hydrogen or methyl, $R_1$ is independenly $C_1$–$C_{18}$ alkyl, $C_2$–$C_{18}$ alkenyl, $C_2$–$C_{18}$ alkynyl, $C_5$–$C_{12}$ cycloalkyl, $C_6$–$C_{10}$ bicycloalkyl, $C_5$–$C_8$ cycloalkenyl, $C_6$–$C_{10}$ aryl, $C_7$–$C_9$ aralkyl, $C_7$–$C_9$ aralkyl substituted by alkyl or aryl, or

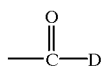

wherein D is $C_1$–$C_{18}$ alkyl, $C_1$–$C_{18}$ alkoxy, phenyl, phenyl substituted by hydroxy, alkyl or alkoxy, or amino or amino mono- or disubstituted by alkyl or phenyl;
m is 1–4,
when m is 1,
$R_2$ is hydrogen, $C_1$–$C_{18}$ alkyl optionally interrupted by one or more oxygen atoms, $C_2$–$C_{12}$ alkenyl, $C_6$–$C_{10}$ aryl, $C_7$–$C_{18}$ aralkyl, glycidyl, a monovalent acyl radical of an aliphatic cycloaliphatic, araliphatic or aromatic carboxylic acid, or of a carbamic acid

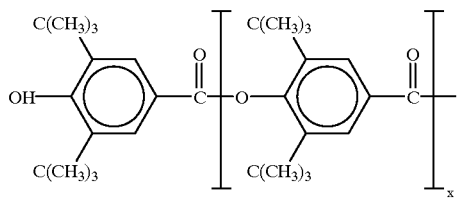

wherein x is 0 or 1, or

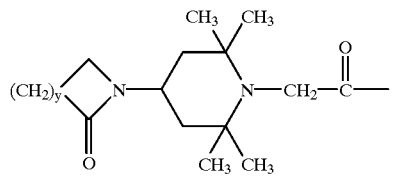

wherein y is 2–4;
when m is 2,
$R_2$ is $C_1$–$C_{12}$ alkylene, $C_4$–$C_{12}$ alkenylene, xylylene, a divalent acyl radical of an aliphatic, cycloaliphatic, araliphatic or aromatic dicarboxylic acid or of a dicarbamic acid,
when m is 3, $R_2$ is a trivalent acyl radical of an aliphatic, unsaturated aliphatic, cycloaliphatic, or aromatic tricarboxylic acid;
whem m is 4, $R_2$ is a tetravalent acyl radical of a saturated or unsaturated aliphatic or aromatic tetracarboxylic acid;
p is 1, 2 or 3.

Another example of a suitable HALS for purposes of the present invention has the formula:

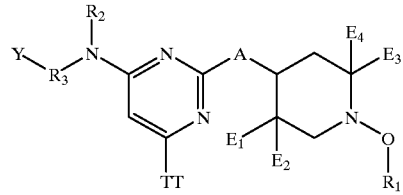

wherein
$E_1$, $E_2$, $E_3$ and $E_4$ are independently alkyl of 1 to 4 carbon atoms, or $E_1$ and $E_2$ are independently alkyl of 1 to 4 carbon atoms and $E_3$ and $E_4$ taken together are pentamethylene, or $E_1$ and $E_2$; and $E_3$ and $E_4$ each taken together are pentamethylene, $R_1$ is alkyl of 1 to 18 carbon atoms, cycloalkyl of 5 to 12 carbon atoms, a bicyclic or tricyclic hydrocarbon radical of 7 to 12 carbon atoms, phenylalkyl of 7 to 12 carbon atoms, phenylalkyl of 7 to 15 carbon atoms, aryl of 6 to 10 carbon atoms or said aryl substituted by one to three alkyl of 1 to 8 carbon atoms,
$R_2$ is hydrogen or a linear or branched chain alkyl of 1 to 12 carbon atoms,
$R_3$ is alkylene of 1 to 8 carbon atoms, or $R_3$ is —CO—, —CO—$R_4$—, —CONR$_2$—, or —CO—NR—$R_4$,
$R_4$ is alkylene of 1 to 8 carbon atoms,
T is phenoxy, phenoxy substituted by one or two alkyl groups of 1 to 4 carbon atoms, alkoxy of 1 to 8 carbon atoms or —N(R$_2$)$_2$ with the stipulation that $R_2$ is not hydrogen, or T is

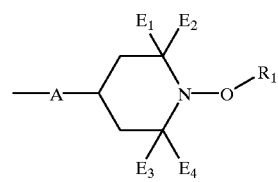

X is —$NH_2$, —NCO, —OH, —O-glycidyl, or —$NHNH_2$, and

Y is —OH, —$NH_2$, —$NHR_2$ where $R_2$ is not hydrogen; or Y is —NCO, —COOH, oxiranyl, —O-glycidyl, or —Si $(OR_2)_3$; or the combination $R_3$— Y— is —$CH_2OR_2$.

In a preferred embodiment $E_1$ to $E_4$ are each methyl;
$R_1$ is cyclohexyl, octyl, methyl, or heptyl;
$R_2$ is hydrogen, butyl, or dodecyl;
$R_3$ is ethylene when Y is —OH or $R_3$ is pentamethylene when Y is —COOH;
$R_4$ is ethylene or hexamethylene; and
A is —$N(R_7)$— wherein $R_7$ is butyl.

The durability enhancing agent includes more than one carbamate or group convertible to a carbamate functionality. Carbamate groups can generally be characterized by the formula:

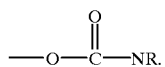

The carbamate is primary or secondary, terminating in H, alkyl or cycloalkyl groups, where the alkyl and cycloalkyl groups include substituted alkyl and cycloalkyl groups. Examples of these include halogenated alkyl and cycoalkyl groups.

Groups that can be converted to carbamate include cyclic carbonate groups, epoxy groups, and ethylenically unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is preferably under elevated pressure (e.g. 60–150 psi). The temperature for this reaction is preferably 60–150° C. Useful catalysts include any that activate an oxirane ring, such as tertiary amine or quaternary salts (e.g. tetramethyl ammonium bromide), combinations of complex organotin halides and alkyl phosphonium halides (e.g., $((CH)_3SnI, BU_4SnI, Bu_4PI$, and $(CH_3)_4PI)$, potassium salts (e.g., $K_2CO_3$, KI) preferably in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with $CO_2$ to form a cyclic carbonate, and then with ammonia or a primary amine to form the carbamate.

The monomeric and oligomeric components reacted with UVA or HALS have a molecular weight of between 148 and 2000, the preferred molecular weight for the monomers oligomers is between 900 and 1092. This is the molecular weight prior to reaction with the UVA or HALS.

Polymers have a molecular weight of between 2,000 and 20,000, the preferred molecular weight for the polymers is between 4000 and 6000. Molecular weight can be determined by the GPC method using a polystyrene standard. The carbamate content of the polymer, on a molecular weight per equivalent of carbamate functionality, will generally be between 200 and 1200, and preferably between 300 and 800. Mixtures of UVAs and HALS may be reacted onto said monomeric, oligomeric and polymeric components.

The oligomeric component according to the invention can be prepared in a variety of ways. One method of preparing oligomeric compounds is to react an alcohol ('alcohol' is defined herein as having one or more OH groups) with more than one urea to form a compound with carbamate groups. This reaction is accomplished by heating a mixture of the alcohol and ureas, preferably in the presence of a catalyst, as is known in the art. Another technique is the reaction of an alcohol with cyanic acid to form a compound with primary carbamate groups (i.e., unsubstituted carbamates). Carbamates may also be prepared by reaction of an alcohol with phosgene and then ammonia to form a compound having primary carbamate groups, or by reaction of an alcohol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful in the invention. They generally have from 1 to 200 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1, 3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Monomeric, oligomeric and polymeric compounds useful for reaction with a UVA or HALS include esters, ethers, epoxy, alkyd, urethane, urea, acrylic, polyamide, amiminoplast, isocyanate and silane monomers, oligomers and polymers and mixtures thereof. The compounds may have more than onecarbamate functional group appended thereto. Alternatively the carbamate group may be reacted onto the UVA or HALS and the UVA or HALS reacted with the monomeric, oligomeric or polymeric compound.

Where, the polymeric component is a carbamate functional acrylic polymer, the polymer is represented by the randomly repeating units according to the following formula:

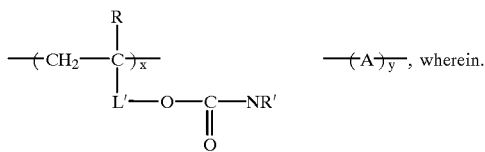

In the above formula, R represents H or $CH_3$, R' represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to photo-induced hydrolysis, and should be avoided in locations that would place the ether linkage in the crosslink matrix. The values x and y represent weight percentages, with x being 10 to 90% and preferably 20 to 50%, and y being 90 to 10% and preferably 80 to 50%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), vinyl toluene, styrene, styrenic derivatives such as α-methyl styrene, t-butyl styrene, and the like.

L represents a divalent linking group, preferably an aliphatic group of 1 to 8 carbon atoms, cycloaliphatic, or aromatic linking group of 6 to 10 carbon atoms. One example of L is:

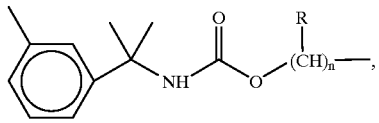

where R represents H, alkyl, preferably of 1 to 6 carbon atoms, or cycloalkyl, preferably up to 6 ring carbon atoms, and n is 1–4. The terms alkyl and cycloalyl are to include substituted alkyl and cycloalkyl, such as halogen-substituted alkyl or cycloalkyl.

Other possible examples of L include: —$(CH_2)$—, —$(CH_2)_2$—, —$(CH_2)_4$—, and the like. In one preferred embodiment, —L— is represented by —COO—L'— where L' is a divalent linking group. Thus, in a preferred embodiment of the invention, the polymer is an acrylic polymer and component (a) is represented by randomly repeating units according to the following formula:

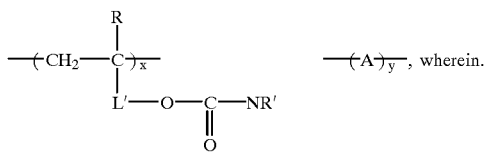

In this formula, R, R' A, x, and y are as defined above. L' may be a divalent aliphatic linking group, preferably of 1 to 8 carbon atoms, e.g., —$(CH_2)$—, —$(CH_2)_2$—, —$(CH_2)_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. This carbamate functional acrylic polymer is described in U.S. Pat. No. 5,474,811 which is hereby incorporated by reference. The carbamate functional polymer component used in the composition of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting ammonia, or a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing a carbamate functional acrylic polymer for use in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing such acrylic polymers involves thermally decomposing urea (to give off ammonia and HNCO) in the presence of a hydroxy-functional acrylic polymer or co-polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but feasible way of preparing the polymer would be to trans-esterify an acrylate polymer with a hydroxyalkyl carbamate.

As described above, polyesters can be used as the polymer or oligomer in the present invention. The polyesters include carbamate groups or groups that can be converted into a carbamate group, such as an active hydrogen group or ethylenically unsaturated group. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Alternatively, or in addition to, the polyester can be formulated with an acid or hydroxy functional carbamate, such as a hydroxy propyl carbamate, or material that can be converted to a carbamate such as glycerin carbamate, as described above.

Polyurethane or polyurea polymers or oligomers useful in the present invention include polyurethanes and polyureas having carbamate groups, or groups that can be converted into carbamate groups as described above for polyesters. They are prepared by a chain extension reaction of a polyisocyanate (e.g., hexamethylene diisocyanate, isophorone diisocyanate, MDI, etc.) and a polyol, polyamine, or combination thereof (e.g., 1,6-hexanediol, 1,4-butanediol, neopentyl glycol, trimethylol propane, 1,6-hexanediamine or hydroxy ethyl amine).

Alternatively, or additionally, a urethane or urea, including monomeric, oligomeric, or polymeric urea or urethane can be formulated with an isocyanate reactive carbamate, such as hydroxy propyl carbmate or 2-amino ethyl carbamate, or a group that can be converted into a carbamate, such as glycerin carbamate, as described above.

The isocyanates suitable for any of these reactions include TDI, MDI, isophorone diisocyanate, hexamethylene diisocyanate, and isocyanurate trimers of these.

Where the UVA or HALS is reacted onto the isocyanate, the UVA or HALS must include at least one isocyanate reactive functionality such as amino or hydroxyl functionality. Where the non-acrylic monomeric, oligomeric or polymeric compounds as described above are used for reaction with a HALS or UVA, the HALS or UVA includes at least one group that can covalently bond with these compounds. For example, for reaction onto a polyester, the reactive functionality on the UVA or HALS may be ester, ether, hydroxyl, acid, or epoxy functionalities. Where the UVA or HALS is reacted onto a urea, urethane, or carbamate oligomer or polymer, the UVA or HALS must include at least one reactive functionality such as hydroxyl, amine, isocyanate or epoxy.

In one embodiment, the bound HALS or UVA is formed by reacting some of the isocyanate with a UVA or HALS having functionality reactive with the isocyanate. Examples of such functionality are hydroxy and amine functionality, preferably not sterically-hindered amines. Some of the remaining isocyanate groups are then carbamate functionalized by reaction with an isocyante reactable material that contains carbamate or a group that can be converted into carbamate. The polyisocyanates used are described in U.S. patent application, having Ser. Nos. 08/333,915; 08/547,513 and 08/686,929.

A coating composition according to the present invention comprises a durability enhancing agent comprising a monomeric, oligomeric or polymeric component having covalently bonded thereto at least one HALS and/or UVA, said durability enhancing agent having appended thereto more than one carbamate functional group or group convertible to a carbamate functional group. The durability enhancing agent may include other reactive functionality that is crosslinkable into a cured coating film. The crosslinkable groups may or may not be on the same moiety as the carbamate functionality.

The monomer, oligomer or polymer having a HALS or UVA bound thereto may comprise the principal resin of the coating composition, or may comprise an additive to the principal resin. The coating composition, optionally, may further comprise a crosslinking agent having groups that are reactive with reactive functionality on the principal resin, and/or with the reactive functionality on the monomer, oligomer or polymer having the UVA or HALS bound thereto.

Where an aminoplast crosslinker is reacted with a UVA or HALS, the aminoplast may include hydroxy or carbamate functionality as a grafting site for the UVA or HALS. Aminoplast functionality must be retained to provide crosslinking sites for reaction with a principal resin in the coating composition. Crosslinking is via the aminoplast functionality on the crosslinker.

A coating composition according to the present invention is cured by self crosslinking, or by reaction of reactive functionality on the principal resin with reactive functionality on a crosslinking agent or mixture of crosslinking agents. The HALS or UVA reacts to crosslink into the cured coating film. Such reactive groups include active methylol or methylalkoxy groups on aminoplast crosslinking agents or on other compounds such as phenol/formaldehyde adducts, isocyanate groups, siloxane groups, cyclic carbonate groups, polyepoxy and anhydride groups. Examples of crosslinking compounds include melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, and a bis- or tris-(alkoxycarbonylamino)-1,3,5 triazine crosslinker from Cytec sold under the trademark TACT®. Aminoplast resin such as melamine formaldehyde resin or urea formaldehyde resin are especially preferred.

While the monomeric, oligomeric or polymeric HALS or UVA component may be used in any layer of a multi-layer coating composition, it is preferably used in a clearcoat composition. The clearcoat may be used alone or with a pigmented basecoat composition.

The pigmented basecoat composition may be any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers.

Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C.

The invention is further illustrated by the following non-limiting examples.

EXAMPLES

Example 1

Acrylic Polymer-Bound Benzotriazole Polymer-bound Ultraviolet Light Absorber

A polymer-bound ultraviolet light absorber containing 2.0% benzotriazole, based on total coating solids, was prepared by polymerizing 28.4 grams of a benzotiazole, sold under the trademark Norbloc™ 7966, available from Noramco, Inc. onto 1514.3 grams of a hydroxy functional carbamate resin, sold under the trademark Ureclear®, commercially available from BASF Corporation. The hydroxy functional carbamate resin had a hydroxy equivalency of 1650 g/equivalent at 95% non-volatile content.

Example 2

Monocarbamate Functional Triazine

To a room temperature (20° C.) a solution of 309.8 parts urethane grade methyl isoamyl ketone, isophorone diisocyanate and 0.6 parts of dibutyl tin dilaurate kept under an inert atmosphere is added over two hours 80.4 parts of hydroxy propyl carbamate. During the addition of the hydroxy propyl carbamate, the temperature of the reaction batch is not allowed to go above 40° C. After the addition of hydroxy propyl carbamate is complete, the reaction temperature is kept below 40° C. and is followed be NCO titration and/or IR spectrometry. Once all of the hydroxy propyl carbamate is incorporated 353.5 parts of a hydroxy functional benzotriazole UVA[1] is then added and the reaction mixture temperature raised to 80° C. The reaction is followed using NCO titration and/or IR spectrometry. Once all of the benzotriazole has been incorporated, 20 parts of isobutyl alcohol is added. The reaction is kept at 80° C. until all of the isocyanate has been consumed. The final product is 65% NV.

[1]This hydroxy functional triazine is described in U.S. Pat. No. 5,461,151, and has the formula

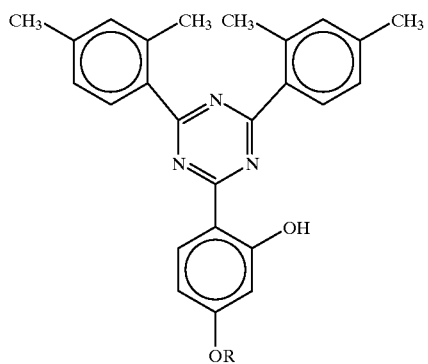

wherein the R moiety is, independently, a linear, branched aliphatic or cycloaliphatic alkyl moiety of 1 to 12 carbon atoms, and is:

(1) interrupted by one or more oxygen atoms; or
(2) substituted by one or more hydroxy groups; or
(3) both interrupted and substituted by the above groups of (1) and (2).

Example 3

Oligomeric Aminoplast-Bound Triazine UVA

A mixture of 456 parts of a hydroxymethylated melamine sold under the trademark Cymel® 300, from Cytec Industries, 1131 parts of the product from Example 2, 500 parts of methanol, and 7 parts of dodecyl benzene sulfonic acid are heated to 69° C. The reaction mixture is kept at 69° C. until all of the product from example one is incorporated as determined by infra red spectrometry. Then 2.0 parts of 2-amino-2-methyl propanol is added. The system is them placed under vacuum (maximum temperature 69° C.) to remove the methanol and isobutanol solvents. The final product is 75.0% NV.

Example 4

Monocarbamate Functional UVA

To a room temperature (20° C.) solution of 259.3 parts urethane grade methyl isoamyl ketone, isophorone diisocyanate and 0.5 parts of dibutyl tin dilaurate kept under an inert atmosphere is added over two hours 80.4 parts of hydroxy propyl carbamate. During the addition the hydroxy propyl carbamate, the temperature of the reaction batch is not allowed to go above 40° C. After the addition of hydroxy propyl carbamate is complete, the reaction temperature is kept below 40° C. and is followed be NCO titration and/or IR spectrometry. Once all of the hydroxy propyl carbamate is incorporated 259.7 parts of hydroxy functional benzotriazole UVA is then added and the reaction mixture temperature raised to 80° C. The reaction is followed using NCO titration and/or IR spectrometry. Once all of the hydroxy functional UVA has been incorporated, 20 parts of isobutyl alcohol is added. The reaction is kept at 80° C. until all of the isocyanate has been consumed. The final product is 65% NV.

Example 5

Oligomeric Aminoplast Bound UVA

A mixture of 456 parts of a hydroxymethylated melamine sold under the trademark Cymel® 300, 1006 parts of the product from Example 4 500 parts of methanol, and 7 parts of dodecyl benzene sulfonic acid are heated to 69° C. The reaction mixture is kept at 69° C. until all of the product from Example 6 is incorporated as determined by infra red spectrometry. 2.0 parts of 2-amino-2-methyl propanol is then added. The is placed under vacuum (maximum temperature 69° C.) to remove the methanol and isobutanol solvents. The final product is 75.0% NV.

Example 6

Carbamate Functional HALS

To a room temperature (20° C.) solution of 298.9 parts urethane grade methyl isoamyl ketone, isophorone diisocyanate and 0.6 parts of dibutyl tin dilaurate kept under an inert atmosphere is added over two hours 80.4 parts of hydroxy propyl carbamate. During the addition the hydroxy propyl carbamate, the temperature of the reaction batch is not allowed to go above 40° C. After the addition of hydroxy propyl carbamate is complete, the reaction temperature is kept below 40° C. and is followed be NCO titration and/or IR spectrometry. Once all of the hydroxy propyl carbamate is incorporated 333.3 parts of hydroxy functional HALS² is then added and the reaction mixture temperature raised to 80° C. The reaction is followed using NCO titration and/or IR spectrometry. Once all of the HALS has been incorporated, 20 parts of isobutyl alcohol is added. The reaction is kept at 80° C. until all of the isocyanate has been consumed. The final product is 65% NV.

²The hydroxy functional hals is described in U.S. Pat. No. 5,216,156 and has the formula:

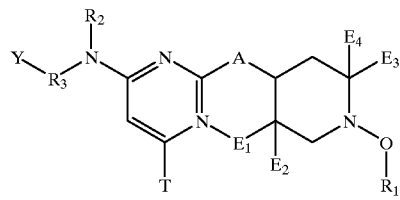

wherein
$E_1$ to $E_4$ are each methyl,
$R_1$ is cyclohexyl, octyl, methyl, or heptyl;
$R_2$ is hydrogen, butyl, or dodecyl;
$R_3$ is alkylene of 1 to 8 carbon atoms, or $R_3$ is —CO—, —CO—$R_4$—, —CONR$_2$—, or —CO—NR—$R_4$,
$R_4$ is alkylene of 1 to 8 carbon atoms,
T is

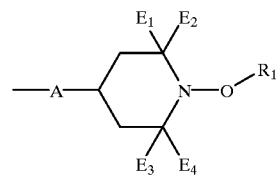

X is —NH$_2$, —NCO, —OH, —O-glycidyl, or —NHNH$_2$, and
Y is —OH, —NH$_2$, —NHR$_2$ where $R_2$ is not hydrogen; or Y is —NCO, —COOH, oxiranyl, —O-glycidyl, or —Si(OR$_2$)$_3$; or the combination $R_3$— Y— is —CH$_2$OR$_2$.

Example 7

Oligomeric-Aminoplast-Bound HALS

A mixture of 456 parts of Cymel® 300 hydroxy methylated melamine, 1190 parts of the product from Example 6, 500 parts of methanol, and 7 parts of dodecyl benzene sulfonic acid are heated to 69° C. The reaction mixture is kept at 69° C. until all of the product from Example six is incorporated as determined by infra red spectrometry. Then 2.0 parts of 2-amino-2-methyl propanol is added. The system is them placed under vacuum (maximum temperature 69° C. to remove the methanol and isobutanol solvents. The final product is 75.0% NV.

Example 8

Oligomer-Bound UVA

A mixture of 164.9 parts of methyl isoamyl ketone, 210 parts of T1890 (the isocyanurate of isophorone diisocyanate sold by Hüls) and 0.1 parts of dibutyl tin dilaurate was heated to 60° C. under an inert atmosphere. 151.5 parts of hydroxy functional triazine UVA³ was then added. The system was heated to 85° C. and monitored by NCO titration and IR spectrometry until all of the hydroxy functional HALS⁴ was incorporated. 68.4 parts of hydroxy propyl carbamate was then added. The reaction temperature was allowed to exotherm to 87° C. The system was kept above 80° C. until all of the hydroxy propyl carbamate was incorporated. Then 42.3 parts of isobutanol and 92.9 parts of methyl isoamyl ketone was added. The reaction mixture was kept above 80° C. until the system tested free of isocyanate by IR spectrometry and/or isocyanate titration. The final product had a NV of 52.6%.

³ UVA as described in Ex. 2

Example 9

Oligomer Bound Benzotriazole UVA

A mixture of 167.8 parts of methyl isoamyl ketone, 210 parts of T1890 (the isocyanurate of isophorone diisocyanate sold by Hüls) and 0.1 parts of dibutyl tin dilaurate and 0.05 parts of methoxyethylhydroquinone was heated to 60° C. under an inert atmosphere. 118.1 parts of hydroxy functional benzotriazole was then added. The system was then heated to 80° C. and monitored by NCO titration and IR spectrometry until all of the benzotriazole was incorporated. 68.4 parts of hydroxy propyl carbamate was then added. The reaction mixture was kept at 80° C. until all of the hydroxy propyl carbamate has been incorporated. 43.6 parts of isobutyl alcohol and 101.6 parts of methyl isoamyl ketone was then added. The system was kept at 80° C. until free of isocyanate by IR spectrometry and/or isocyanate titration. The final product had a NV of 48.2%

Coating Example (Control)

A control coating composition was prepared having the following formulation:

| Ingredient | Amount |
|---|---|
| Carbamate functional acrylic resin | 75.51 |
| Resimine 747 Aminoplast | 20.66 |
| Acid Catalyst | 1.00 |
| Fumed Silica Rheoloqy Control Additive | 1.31 |
| Flow Control Additive | 0.20 |
| Adhesion promoter | 1.32 |
| Total | 100.00 |

¹ Carbamate functional acrylic available from BASF Corp. under the trademark Ureclear ®, as described in U.S. Pat. 5,356,669.

TABLE 1

Comparative Results for Coating Compositions Containing UVAs and HALS
To the control coating composition set forth above were added the following UVA and HALS components. Amounts are in percent by weight based on total coating composition solids content.

| UVA or HALS Additive | Ex. A | Ex. B | Ex. C |
|---|---|---|---|
| Polymer-bound benzotriazole UVA per Ex. 1 | 2% | — | — |
| Oligomer-bound UVA from Ex. 9 | — | 2.0 | — |
| Oligomer-bound HALS from Ex. 7 | 1.5 | 1.5 | 1.5% |
| Oligomer Bound Triazine UVA from Ex. 8 | — | 1.0% | 1.0% |
| Benzotriazole UVA free add** | — | — | 2.0 |

*HALS and UVA components that are not polymer or oligomer bound.
**proprietary benzotriazoie UVA.

TABLE 2

Comparative Results for Etch

| Example | Etch Rating after 10 weeks |
|---|---|
| Control | 6 |
| Ex. A | 3-4 |
| Ex. B | 4 |
| Ex. C | 5 |

We claim:
1. A curable coating composition comprising
   A) an oligomeric or polymeric resin comprising crosslinkable functional groups wherein said oligomer or polymeric resin is selected from the group consisting of esters, ethers, epoxy, alkyd, urethane urea, acrylic, and polyamide, oligomers and polymers and mixtures thereof, and
   B) a crosslinking agent comprising the reaction product of a) durability enhancing agents selected from the group consisting of hindered amine light stabilizers (HALS), ultraviolet light absorbers (UVAs) and mixtures thereof, where a) comprises more than one primary carbamate reactive functionality and b) crosslinking compounds selected from the group consisting of aminoplast, blocked and unblocked polyisocyanates, isocyanurate trimers of the polyisocyanates, urea resins, alkoxy ureas, polyanhydrides, polyepoxies and polysiloxanes,
wherein said durability enhancing agents have the following formula:
   a UVA selected from the group consisting of polymer-bound benzotriazoles having the formula:

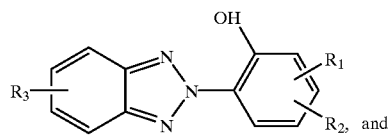
(Ia)

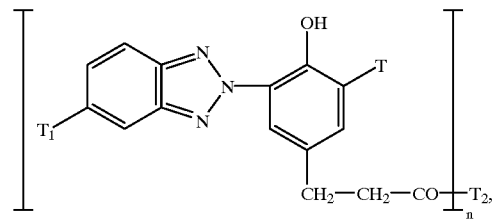
(Ib)

wherein in the compounds of the formula (Ia),
   $R_1$, is selected from the group consisting of hydrogen, alkyl having 1 to 24 carbon atoms, phenylalkyl having 1 to 4 carbon atoms in the alkyl moiety, and
   $R_2$ is selected from the group consisting of hydrogen, halogen, alkyl having 1 to 18 carbons, phenyl alkyl having 1 to 4 carbons in the alkyl moiety,
   $R_3$ is selected from the group consisting of hydrogen, chlorine, alkyl having 1 to 4 carbon atoms; with at least one of the radicals $R_1$ and $R_2$ being other than hydrogen;
   in formula (Ib) T is hydrogen or alkyl having 1 to 6 carbon atoms,
   $T_1$ is hydrogen, chlorine or alkyl having 1 to 4 carbon atoms, and n is 1 or 2,
   when n is 1, $T_2$ is chlorine or a radical of the formula —$OT_3$, where T3 is hydrogen, alkyl which has 1 to 18 carbon atoms and is unsubstituted or substituted by 1 to 3 hydroxyl groups; alkyl which has 3 to 18 carbon atoms interrupted once or several times by —O— and is unsubstituted or substituted by hydroxyl; alkenyl which has 2 to 18 carbon atoms and is unsubstituted or substituted by hydroxyl; phenylalkyl having 1 to 4 carbon atoms in the alkyl moiety, or a radical of the formula —$CH_2CH(OH)$—$T_7$ or glycidyl;
   where $T_7$ is hydrogen, alkyl having 1 to 18 carbon atoms, phenyl which is unsubstituted or substituted by hydroxyl; and if n is 2, $T_2$ is a radical of the formula —O—$T_9$—O—,
   $T_9$ is alkylene having 2 to 8 carbon atoms, alkenylene having 4 to 8 carbon atoms, cyclohexylene, alkylene which has 2 to 18 carbon atoms and is interrupted once or several times by —O—,
polymer-bound 2-hydroxyphenyl triazines having the formula (IIa)

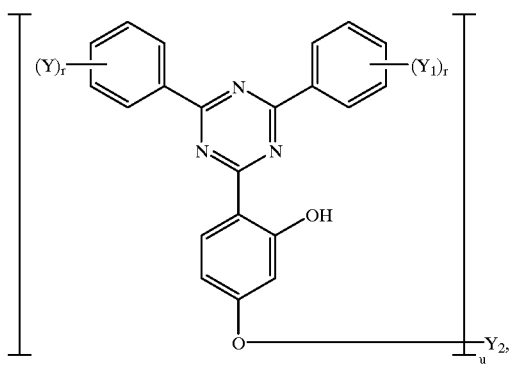

in the formula (IIa)
u is 1 to 2,
r is an integer from 1 to 3,
the substituents $Y_1$ independently of one another are hydrogen, hydroxyl, halogen, halogenomethyl, alkyl having 1 to 12 carbon atoms, alkoxy having 1 to 18 carbon atoms,
when u is 1, $Y_2$ is alkyl having 1 to 18 carbon atoms, alkyl which has 1 to 12 carbon atoms and is substituted by —COOH —$COOY_8$, —$CONH_2$, $CONHY_9$, —$ONY_9Y_{10}$, —CN, —$OCOY_{11}$, or mixtures thereof; alkyl which has 4 to 20 carbon atoms which is interrupted by one or more oxygen atoms and is unsubstituted or substituted by hydroxyl or alkoxy having 1 to 12 carbon atoms; alkenyl having 3 to 6 carbon atoms, glycidyl, phenylalkyl which has 1 to 5 carbon atoms in the alkyl moiety and is unsubstituted or substituted by hydroxyl, chlorine and or methyl; —$COY_{12}$ or $SO_2Y_{13}$,
wherein $Y_8$ is amine, alkylamine or cycloalkyamine wherein the alkyl or cycloalkyl has 1 to 6 carbons in the alkyl or cycloalkyl portion, alkyl having 1 to 18 carbon atoms, alkenyl having 3 to 18 carbon atoms, alkyl which has 3 to 20 carbon atoms, and is interrupted by one or more oxygen atoms, or said alkyl substituted by substituted by hydroxyl; alkenyl having 3 to 18 carbon atoms, glycidyl or phenylalkyl having 1 to 5 carbon atoms in the alkyl moiety,
$Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical; and when u is 2, $Y_2$ is alkylene having 2 to 16 carbon atoms, alkylene having 4 to 12 carbon atoms and is interrupted by one or more —O— atoms and/or is substituted by hydroxyl; —CH$_2$CH(OH)CH$_2$—O—Y$_{15}$—OCH$_2$CH(OH)CH$_2$, or —(CH$_2$)$_m$—CO$_2$—Y$_{18}$—OCO—(CH$_2$)$_m$, in which m is 1,2 or 3, $Y_{15}$ is alkylene having 2 to 10 carbon atoms, phenylene or a group -phenylene-M-phenylene- in which M is —O—, —S—, —SO$_2$—, —CH$_2$— or —C(CH$_3$)$_2$—, and $Y_{18}$ is alkylene having 2 to 10 carbon atoms or alkylene which has 4 to 20 carbon atoms and is interrupted once or several times by oxygen, and compounds of formula (III) having the formula:

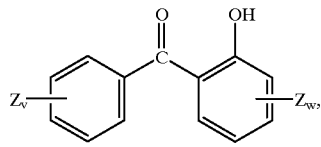

where v is an integer from 1 to 3 and w is 1 or 2 and the substituents Z independently of one another are hydrogen, halogen, hydroxy or alkoxy having 1 to 12 carbon atoms, and mixtures of any of the preceding compounds (Ia)–(III).

a HALS selected from the group consisting of HALS having the formula

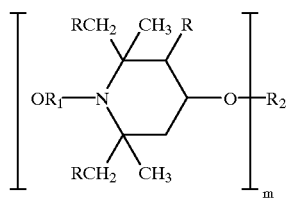

wherein R is hydrogen or methyl, $R_1$ is independently $C_1$–$C_{18}$ alkyl, $C_2$–$C_{18}$ alkenyl, $C_2$–$C_{18}$ alkynyl, $C_5$–$C_{12}$ cycloalkyl, $C_6$–$C_{10}$ bicycloalkyl, $C_5$–$C_8$ cycloalkenyl, $C_6$–$C_{10}$ aryl, $C_7$–$C_9$ aralkyl, $C_7$–$C_9$ aralkyl substituted by alkyl or aryl, or

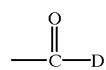

wherein D is $C_1$–$C_{18}$ alkyl, $C_1$–$C_{18}$ alkoxy, phenyl, phenyl substituted by hydroxy, alkyl or alkoxy, or amino or amino mono- or disubstituted by alkyl or phenyl;

m is 1–4, when m is 1, $R_2$ is hydrogen, $C_1$–$C_{18}$ alkyl optionally interrupted by one or more oxygen atoms, $C_2$–$C_{12}$ alkenyl, $C_6$–$C_{10}$ aryl, $C_7$–$C_{18}$ aralkyl, glycidyl, a monovalent acyl radical of an aliphatic cycloaliphatic, araliphatic or aromatic carboxylic acid, or of a carbamic acid

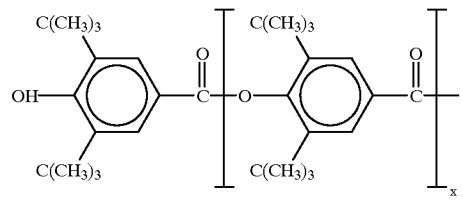

wherein x is 0 or 1, or

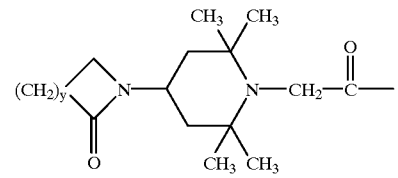

wherein y is 2–4;

when m is 2, $R_2$ is $C_{1-C12}$ alkylene, $C_4$–$C_{12}$ alkenylene, oxyalkylene, a divalent acyl radical of an aliphatic, cycloaliphatic, araliphatic or aromatic dicarboxylic acid or of a dicarbamic acid, when m is 3, $R_2$ is a trivalent acyl radical of an aliphatic, unsaturated aliphatic, cycloaliphatic, or aromatic tricarboxylic acid;

when m is 4, $R_2$ is a tetravalent acyl radical of a saturated or unsaturated aliphatic or aromatic tetracarboxylic acid;

p is 1, 2 or 3;

a HALS having the formula

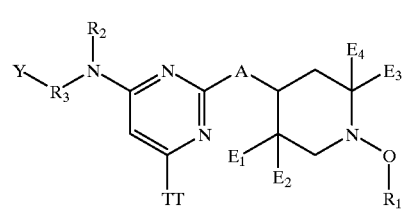

wherein $E_1$, $E_2$, $E_3$ and $E_4$ are independently alkyl of 1 to 4 carbon atoms, or $E_1$ and $E_2$ are independently alkyl of 1 to 4 carbon atoms and $E_3$ and $E_4$ taken together are pentamethylene, or $E_1$ and $E_2$; and $E_3$ and $E_4$ each taken together are pentamethylene, $R_1$ is alkyl of 1 to 18 carbon atoms, cycloalkyl of 5 to 12 carbon atoms, a bicyclic or tricyclic hydrocarbon radical of 7 to 12 carbon atoms, phenylalkyl of 7 to 12 carbon atoms, phenylalkyl of 7 to 15 carbon atoms, aryl of 6 to 10 carbon atoms or said aryl substituted by one to three alkyl of 1 to 8 carbon atoms, $R_2$ is hydrogen or a linear or branched chain alkyl of 1 to 12 carbon atoms, R₃ is alkylene of 1 to 8 carbon atoms, or R₃ is —CO—, —CO—R₄—, —CONR₂—, or —CO—NR—R₄, R₄ is alkylene of 1 to 8 carbon atoms, T is phenoxy, phenoxy substituted by one or two alkyl groups of 1 to 4 carbon atoms, alkoxy of 1 to 8 carbon atoms or —N(R₂)₂ with the stipulation that R₂ is not hydrogen, or T is

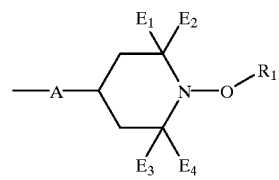

X is —NH₂, —NCO, —OH, —O-glycidyl, or —NHNH₂, and

Y is —OH, —NH₂, —NHR₂ where R₂ is not hydrogen; or Y is —NCO, —COOH, oxiranyl, —O-glycidyl, or —Si(OR₂)₃; or the combination R₃—Y— is —CH₂OR₂.

2. The coating composition of claim 1 wherein the crosslinking compound is selected from the group consisting of monomeric and polymeric melamine formaldehyde resins which are fully or partially alkylated.

3. The coating composition of claim 1 wherein the crosslinking compound comprises polyisocyanate or the isocyanurate trimers thereof. reactive with the polyisocyanate or isocyanurate trimers thereof, selected from the group consisting of amine, primary carbamate and hydroxyl functionality.

4. A curable coating composition comprising

A) an oligomeric or polymeric resin comprising crosslinkable functional groups, and B) a crosslinking agent comprising thereon a durability enhancing agent and functionality reactive with the crosslinkable functional groups of (A), wherein component B) is the reaction product of a) compounds selected from the group consisting of hindered amine light stabilizers (HALS), ultraviolet light absorbers (UVAs) and mixtures thereof, said compounds having more than one primary carbamate reactive functionality thereon to react with component (b), where component b) is a monomeric, oligomeric or polymeric component selected from the group consisting of aminoplast compounds which are fully or partially alkylated and wherein said compounds a) have the following formula:

a UVA selected from the group consisting of polymer-bound benzotriazoles having the formula:

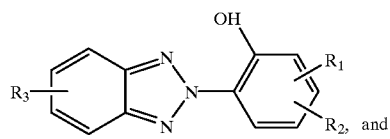

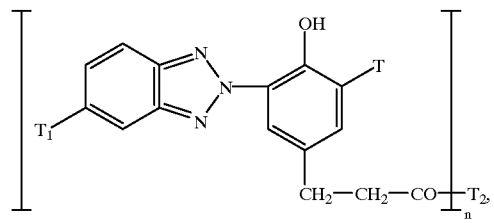

wherein in the compounds of the formula (Ia),

R₁, is selected from the group consisting of hydrogen, alkyl having 1 to 24 carbon atoms, phenylalkyl having 1 to 4 carbon atoms in the alkyl moiety, and R₂ is selected from the group consisting of hydrogen, halogen, alkyl having 1 to 18 carbons, phenyl alkyl having 1 to 4 carbons in the alkyl moiety, R₃ is selected from the group consisting of hydrogen, chlorine, alkyl having 1 to 4 carbon atoms; with at least one of the radicals R₁ and R₂ being other than hydrogen; in formula (Ib) T is hydrogen or alkyl having 1 to 6 carbon atoms, T₁ is hydrogen, chlorine or alkyl having 1 to 4 carbon atoms, and n is 1 or 2, when n is 1, T₂ is chlorine or a radical of the formula —OT₃, where T3 is hydrogen, alkyl which has 1 to 18 carbon atoms and is unsubstituted or substituted by 1 to 3 hydroxyl groups; alkyl which has 3 to 18 carbon atoms interrupted once or several times by —O— and is unsubstituted or substituted by hydroxyl; alkenyl which has 2 to 18 carbon atoms and is unsubstituted or substituted by hydroxyl; phenylalkyl having 1 to 4 carbon atoms in the alkyl moiety, or a radical of the formula —CH₂CH(OH)—T₇ or glycidyl;

where T₇ is hydrogen, alkyl having 1 to 18 carbon atoms, phenyl which is unsubstituted or substituted by hydroxyl; and if n is 2, T₂ is a radical of the formula —O—T₉—O—, T₉ is alkylene having 2 to 8 carbon atoms, alkenylene having 4 to 8 carbon atoms, cyclohexylene, alkylene which has 2 to 18 carbon atoms and is interrupted once or several times by —O—, polymer-bound 2-hydroxyphenyl triazines having the formula (IIa)

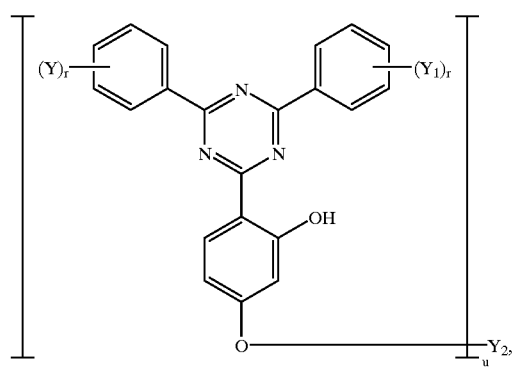

in the formula (IIa)
u is 1 to 2,
r is an integer from 1 to 3, the substituents $Y_1$ independently of one another are hydrogen, hydroxyl, halogen, halogenomethyl, alkyl having 1 to 12 carbon atoms, alkoxy having 1 to 18 carbon atoms, when u is 1, $Y_2$ is alkyl having 1 to 18 carbon atoms, alkyl which has 1 to 12 carbon atoms and is substituted by —COOH —COO$Y_8$, —CONH$_2$, CONH$Y_9$, —ON$Y_9Y_{10}$, —CN, —OCO$Y_{11}$, or mixtures thereof; alkyl which has 4 to 20 carbon atoms which is interrupted by one or more oxygen atoms and is unsubstituted or substituted by hydroxyl or alkoxy having 1 to 12 carbon atoms; alkenyl having 3 to 6 carbon atoms, glycidyl, phenylalkyl which has 1 to 5 carbon atoms in the alkyl moiety and is unsubstituted or substituted by hydroxyl, chlorine and or methyl; —CO$Y_{12}$ or SO$_2Y_{13}$, wherein $Y_8$ is amine, alkylamine or cycloalkyamine wherein the alkyl or cycloalkyl has 1 to 6 carbons in the alkyl or cycloalkyl portion, alkyl having 1 to 18 carbon atoms, alkenyl having 3 to 18 carbon atoms, alkyl which has 3 to 20 carbon atoms, and is interrupted by one or more oxygen atoms, or said alkyl substituted by substituted by hydroxyl; alkenyl having 3 to 18 carbon atoms, glycidyl or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical; and when u is 2, $Y_2$ is alkylene having 2 to 16 carbon atoms, alkylene having 4 to 12 carbon atoms and is interrupted by one or more —O— atoms and/or is substituted by hydroxyl; —CH$_2$CH(OH)CH$_2$—O—$Y_{15}$—OCH$_2$CH(OH)CH$_2$, or —(CH$_2$)$_m$—CO$_2$—$Y_{18}$—OCO—(CH$_2$)$_m$, in which m is 1,2 or 3, $Y_{15}$ is alkylene having 2 to 10 carbon atoms, phenylene or a group -phenylene-M-phenylene- in which M is —O—, —S—, —SO$_2$—, —CH$_2$— or —C(CH$_3$)$_2$—, and $Y_{18}$ is alkylene having 2 to 10 carbon atoms or alkylene which has 4 to 20 carbon atoms and is interrupted once or several times by oxygen, and compounds of formula (III) having the formula:

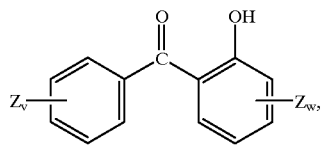

where v is an integer from 1 to 3 and w is 1 or 2 and the substituents Z independently of one another are hydrogen, halogen, hydroxy or alkoxy having 1 to 12 carbon atoms, and mixtures of any of the preceding compounds (Ia)–(III).

a HALS selected from the group consisting of HALS having the formula

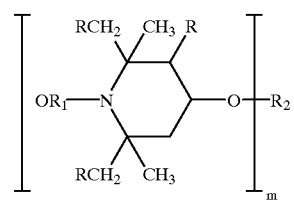

wherein R is hydrogen or methyl, $R_1$ is independently $C_1$–$C_{18}$ alkyl, $C_2$–$C_{18}$ alkenyl, $C_2$–$C_{18}$ alkynyl, $C_5$–$C_{12}$ cycloalkyl, $C_6$–$C_{10}$ bicycloalkyl, $C_5$–$C_8$ cycloalkenyl, $C_6$–$C_{10}$ aryl, $C_7$–$C_9$ aralkyl, $C_7$–$C_9$ aralkyl substituted by alkyl or aryl, or

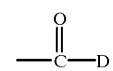

wherein D is $C_1$–$C_{18}$ alkyl, $C_1$–$C_{18}$ alkoxy, phenyl, phenyl substituted by hydroxy, alkyl or alkoxy, or amino or amino mono- or disubstituted by alkyl or phenyl;

m is 1–4, when m is 1, $R_2$ is hydrogen, $C_1$–$C_{18}$ alkyl optionally interrupted by one or more oxygen atoms, $C_2$–$C_{12}$ alkenyl, $C_6$–$C_{10}$ aryl, $C_7$–$C_{18}$ aralkyl, glycidyl, a monovalent acyl radical of an aliphatic cycloaliphatic, araliphatic or aromatic carboxylic acid, or of a carbamic acid

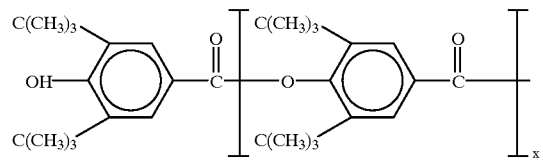

where x is 0 or 1, or

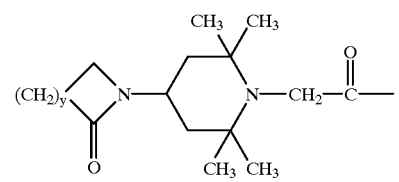

wherein y is 2–4;

when m is 2, $R_2$ is $C_1$–$C_{12}$ alkylene, $C_4$–$C_{12}$ alkenylene, oxyalkylene, a divalent acyl radical of an aliphatic, cycloaliphatic, araliphatic or aromatic dicarboxylic acid or of a dicarbamic acid, p1 when m is 3, $R_2$ is a trivalent acyl radical of an aliphatic, unsaturated aliphatic, cycloaliphatic, or aromatic tricarboxylic acid;

when m is 4, $R_2$ is a tetravalent acyl radical of a saturated or unsaturated aliphatic or aromatic tetracarboxylic acid;

p is 1, 2 or 3;

a HALS having the formula

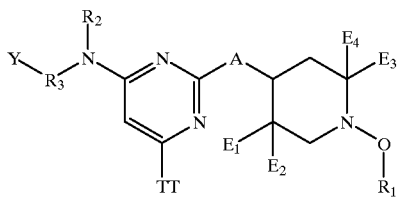
(II)

wherein $E_1$, $E_2$, $E_3$ and $E_4$ are independently alkyl of 1 to 4 carbon atoms, or $E_1$ and $E_2$ are independently alkyl of 1 to 4 carbon atoms and $E_3$ and $E_4$ taken together are pentamethylene, or $E_1$ and $E_2$; and $E_3$ and $E_4$ each taken together are pentamethylene, $R_1$ is alkyl of 1 to 18 carbon atoms, cycloalkyl of 5 to 12 carbon atoms, a bicyclic or tricyclic hydrocarbon radical of 7 to 12 carbon atoms, phenylalkyl of 7 to 12 carbon atoms, phenylalkyl of 7 to 15 carbon atoms, aryl of 6 to 10 carbon atoms or said aryl substituted by one to three alkyl of 1 to 8 carbon atoms, $R_2$ is hydrogen or a linear or branched chain alkyl of 1 to 12 carbon atoms, $R_3$ is alkylene of 1 to 8 carbon atoms, or $R_3$ is —CO—, —CO—$R_4$—, —CONR$_2$—, or —CO—NR—$R_4$, $R_4$ is alkylene of 1 to 8 carbon atoms, T is phenoxy, phenoxy substituted by one or two alkyl groups of 1 to 4 carbon atoms, alkoxy of 1 to 8 carbon atoms or —N(R$_2$)$_2$ with the stipulation that $R_2$ is not hydrogen, or T is

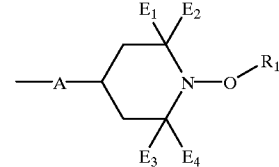

X is —NH$_2$, —NCO, —OH, —O-glycidyl, or —NHNH$_2$, and Y is —OH, —NH$_2$, —NHR$_2$ where $R_2$ is not hydrogen; or Y is —NCO, —COOH, oxiranyl, —O-glycidyl, or —Si(OR$_2$)$_3$; or the combination $R_3$—Y— is —CH$_2$OR$_2$.

* * * * *